United States Patent
Brown et al.

(10) Patent No.: US 11,453,921 B2
(45) Date of Patent: Sep. 27, 2022

(54) SYSTEM FOR AND METHOD OF PROCESSING SUGAR CANE

(71) Applicant: BIOMASS TECHNOLOGIES PTY LTD, St Leonards (AU)

(72) Inventors: Rodney A. Brown, St. Leonards (AU); Maxwell A. Scott, St. Leonards (AU); Mark Diamond, St. Leonards (AU)

(73) Assignee: BIOMASS TECHNOLOGIES PTY LTD, Balmain (AU)

( * ) Notice: Subject to any disclaimer, the term of this patent is extended or adjusted under 35 U.S.C. 154(b) by 0 days.

(21) Appl. No.: 16/610,023

(22) PCT Filed: Apr. 13, 2018

(86) PCT No.: PCT/AU2018/050338
§ 371 (c)(1),
(2) Date: Oct. 31, 2019

(87) PCT Pub. No.: WO2018/201183
PCT Pub. Date: Nov. 8, 2018

(65) Prior Publication Data
US 2020/0063222 A1 Feb. 27, 2020

(30) Foreign Application Priority Data
May 1, 2017 (AU) ................................. 2017901576

(51) Int. Cl.
*C13B 20/16* (2011.01)
*A23L 29/30* (2016.01)
(Continued)

(52) U.S. Cl.
CPC ................ *C13B 20/16* (2013.01); *A23L 3/16* (2013.01); *A23L 3/32* (2013.01); *A23L 29/30* (2016.08);
(Continued)

(58) Field of Classification Search
CPC ........... C13B 20/16; C13B 25/00; C13B 5/04; C13B 10/006; C13B 10/00; C13B 20/00;
(Continued)

(56) References Cited

U.S. PATENT DOCUMENTS 2,261,919 A * 11/1941 Pittman ................. C13B 20/005
127/41
2,526,111 A * 10/1950 John ....................... C13B 20/12
127/55

(Continued)

FOREIGN PATENT DOCUMENTS

FR 3018080 A1 9/2015
GB 1377438 A 12/1974
(Continued)

OTHER PUBLICATIONS

Myer Freeman and Laurence Moyer, "The chlorophyll-protein complex", I. electrophoretic properties and isoelectric point, Division of Agricultural Biochemistry and the Department of Botany, The University of Minnesota, published, Mar. 20, 1942, The Journal of General Physiology, pp. 755-764. (Year: 1942).*

(Continued)

*Primary Examiner* — Joseph W Drodge
(74) *Attorney, Agent, or Firm* — Lowenstein Sandler LLP (57) ABSTRACT

A method of processing raw sugar cane juice, comprising: reducing the pH of the sugar cane juice to a pH at which microbiological activity is substantially eliminated; separating chlorophyll from the sugar cane juice; separating particles having a diameter greater than 0.5 microns from the sugar cane juice; denaturing polyphenol oxidase (PPO) in the sugar cane juice by pasteurisation; separating the denatured polyphenol oxidase from the sugar cane juice.

8 Claims, 7 Drawing Sheets

(51) Int. Cl.
*A23L 3/16* (2006.01)
*A23L 3/32* (2006.01)
*C13B 25/00* (2011.01)
*B01D 21/26* (2006.01)
*B01D 61/16* (2006.01)

(52) U.S. Cl.
CPC ............ *B01D 21/262* (2013.01); *B01D 61/16* (2013.01); *C13B 25/00* (2013.01); *A23V 2002/00* (2013.01)

(58) Field of Classification Search
CPC ....... C13B 10/02; C13B 20/08; C13B 20/165; A23L 29/30; A23L 3/16; A23L 3/32; A23L 2/04; A23L 2/68; A23L 2/70; A23L 2/72; A23L 3/3508; A23L 2/42; A23L 2/46; A23L 2/74; A23V 2002/00; C13K 11/00; C13K 13/002; C13K 13/00; C13K 1/02; C13K 1/04; Y02E 50/16; C12P 19/00; C12P 19/12; C12P 2201/00; C12P 2203/00; B01D 15/08; B01D 17/0217; B01D 21/26; B01D 21/262; B01D 36/00; B01D 61/16; B01D 61/20; B01D 2311/2676; B01D 61/14; B01D 61/147; B01D 2311/18
USPC ............................... 127/2, 11, 42, 53, 55, 56
See application file for complete search history.

(56) References Cited

U.S. PATENT DOCUMENTS

| | | | | |
|---|---|---|---|---|
| 2,949,364 | A * | 8/1960 | Bilenker | A23F 5/265 426/238 |
| 4,784,859 | A * | 11/1988 | Lashley | C12G 3/021 426/11 |
| 6,068,869 | A | 5/2000 | Ginslov | |
| 6,306,344 | B1 * | 10/2001 | Hattori | A23L 7/152 422/21 |
| 6,723,367 | B2 | 4/2004 | Singh et al. | |
| 2005/0196476 | A1 * | 9/2005 | Zhou | A61P 43/00 424/769 |
| 2006/0216385 | A1 * | 9/2006 | Kargel | A23L 19/03 426/520 |
| 2008/0168982 | A1 * | 7/2008 | Vente | C13B 20/148 127/9 |
| 2009/0022830 | A1 * | 1/2009 | Palu | A61K 36/746 424/774 |
| 2011/0232343 | A1 * | 9/2011 | Mantelatto | C13B 25/06 71/11 |
| 2012/0251665 | A1 | 10/2012 | Larsen et al. | |
| 2013/0042858 | A1 * | 2/2013 | Roy | B01D 9/0018 127/16 |
| 2016/0249669 | A1 * | 9/2016 | Schnorr | A23L 2/02 426/10 |
| 2017/0112169 | A1 | 4/2017 | Zhang et al. | |
| 2018/0142314 | A1 * | 5/2018 | Eyal | C13B 5/04 |
| 2018/0206523 | A1 * | 7/2018 | Kiel | A23J 1/006 |
| 2018/0298457 | A1 * | 10/2018 | Ridenour | C13B 25/04 |

FOREIGN PATENT DOCUMENTS

| | | |
|---|---|---|
| JP | S54119066 A | 9/1979 |
| JP | S58056642 | 4/1983 |
| JP | 2003289833 A | 10/2003 |
| JP | 2006020521 A | 1/2006 |
| WO | 9527798 A1 | 10/1995 |
| WO | 0058525 A1 | 10/2000 |
| WO | 2008034180 A1 | 3/2008 |
| WO | 2013096996 A1 | 7/2013 |
| WO | 2015152271 A1 | 10/2015 |

OTHER PUBLICATIONS

Jerimiah Ridenour et al., Specification for U.S. Appl. No. 62/484,724, filed Apr. 12, 2017. (Year: 2017).*
International Search Report for PCT/AU2018/050338 dated May 14, 2018, 5 pgs.
Kunitake, M.T., et al., "Effect of Pasteurization Temperature on Sensory Stability of an Acidified Sugarcane Juice Beverage," Journal of Food Processing and Technology, 2014, pp. 554-561 vol. 538 Issue 6.
Rezzadori, K., et al., "Effects of tangential microfiltration and pasteurisation of the rheological, microbiological, physico-chemical and sensory characteristics of sugar cane juice," International Journal of Food Science and Technology, 2013, pp. 1-9, vol. 48.
Sangeeta, B.S.H., et al., "Studies on Stability of Sugarcane Juice Blended with Anola Juice at Refrigerated and Room Temperature," International Journal of Agriculture and Food Science Technology, 2013, pp. 1027-1036, vol. 4, No. 10.
Office Action for JP2019-560692 dated Oct. 26, 2020, 5 pages.
Supplemental European Search Report for EP1879441 dated Aug. 28, 2020 ,1 page.
Written Opinion for JP 2019-560692 dated May 6, 2021, 5 pages.

* cited by examiner

SYSTEM FOR AND METHOD OF PROCESSING SUGAR CANE

CROSS-REFERENCE TO RELATED APPLICATION(S)

This application is a national phase entry under 35 U.S.C. § 371 of International Application No. PCT/AU2018/050338, filed on Apr. 13, 2018. The content of the application is hereby incorporated by reference herein in its entirety.

TECHNICAL FIELD

The present disclosure relates to biomass processing and in particular to the processing of raw sugar cane.

BACKGROUND

Sugar cane is a tall growing monocotyledonous crop plant that is cultivated in the tropical and subtropical regions of the world primarily for its ability to store high concentrations of sucrose, or sugar, in the internodes of the stem. Sorghum is a close relative of sugarcane and like sugarcane, particular varieties of sorghum, known as "sweet sorghums", also accumulate large amounts of sugar in their stems. Near the time of grain maturity, sweet sorghums have 10 to 25% sugar in stalk juice, with sucrose being the predominant disaccharide.

Typically, the sugar cane grows for 10 to 18 months before harvest and mature sugar cane stands between two to four metres high and is ideally harvested when the sugar content is at its highest. In Australia and other technically advanced countries, sugar cane is harvested by a variety of mechanical harvesters. The harvesters cut the cane stalks at their base, close to the ground, and feed the cane stalks through a variety of cutting implements to produce billets of cane which can be readily collected and transported to the mills for further processing.

The billets of cane are typically collected in bins and are hauled to sugar cane mills by a variety of methods, such as diesel locomotives or the like. The cane is typically processed such that the cane harvested earliest is processed first to maintain a fresh cane supply to the mill. The cane is then typically shredded in a hammermill to shred the cane into fibrous material. The shredded cane is then typically fed through a series of crushing mills to extract the sugar rich juice from the fibrous material. Typically, the juice is then dehydrated by boiling, leaving a dry crystalline sugar product.

It has been found that the non-sugar part of the juice has many positive health effects when consumed. This part of the juice has an abundance of vitamins and minerals including calcium, chromium, cobalt, copper, magnesium, manganese, phosphorous, potassium and zinc. It may also contains iron and vitamins A, C, B1, B2, B3, B5 and B6 alongside a high concentration of phytonutrients, antioxidants and other health-promoting compounds.

The nutritional value of sugar cane juice reduces exponentially after the cane is cut. Traditional methods of processing sugar cane into a final, food grade, juice introduce significant delays during and between each step of processing (from harvesting to the output of the final product), thereby reducing the quality and health benefits of the final product along the way. Additionally, traditional processing methods produce sugar cane juice which is discoloured due to enzymatic browning.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

According to a first aspect of the disclosure, there is provided a method of processing raw sugar cane juice, comprising: reducing the pH of the sugar cane juice to a pH at which microbiological activity is substantially eliminated; separating chlorophyll from the sugar cane juice; separating particles having a diameter greater than 0.5 microns from the sugar cane juice; denaturing polyphenol oxidase (PPO) in the sugar cane juice by pasteurisation; separating the denatured polyphenol oxidase from the sugar cane juice.

The method may further comprise increasing the pH of the sugar cane juice after denaturing the PPO and before separating the denatured PPO from the sugar cane juice.

The method may further comprise heating the reduced pH sugar cane juice to between 50° C. and 70° C. before separating the chlorophyll from the reduced pH sugar cane juice.

The method may further comprise separating one or more of the chlorophyll, the separating of the particles having a diameter greater than 0.5 microns, and the separating of denatured polyphenol oxidase from the sugar cane juice comprises centrifuging the sugar cane juice.

Separating of the particles having a diameter greater than 0.5 microns from the sugar cane may comprise microfiltering the sugar cane juice or bactofuging the sugar cane juice.

The pasteurisation may comprise one or more of:
a) heat pasteurisation;
b) pulsed electric field (PEF) pasteurisation; and
c) high pressure pasteurisation.

Reducing the pH may comprise reducing the pH to between 3.8 and 4.2.

Reducing the pH of the raw sugar cane juice may comprise reducing the pH to the isoelectric point of a centerpiece constituent of chlorophyll present in the raw sugar cane juice. The pH may be reduced using citric acid.

Increasing of the pH may comprise increasing the pH to between 4.2 and 7. The pH may be increased using sodium bicarbonate.

The filtering may comprise removing particles having a diameter greater than 0.2 microns.

The pasteurisation may comprise heating the filtered sugar cane juice to between 80° C. and 100° C. for between 10 and 20 seconds.

The pasteurisation may comprise heating the filtered sugar cane juice. The sugar cane juices may be cooled before increasing the pH of the pasteurised sugar cane juice.

The sugar cane juice may be agitated during one or more of the steps of reducing pH, increasing pH, and pasteurisation.

The method may further comprise concentrating the sugar cane juice by evaporation to form a concentrated sugar cane syrup.

The method may further comprise cleaning sugar cane; and extracting the raw sugar cane juice from the cleaned sugar cane. The cleaning of the sugar cane may comprise pressure washing, tumbling and/or scrubbing the sugar cane.

Cleaning of the sugar cane may comprise irrigating the sugar cane with a biocide or a peroxide.

The extracting may comprise separating sugar cane fibre from the extracted sugar cane juice. The method may further comprise drying the sugar cane fibre.

The method may further comprise, before drying the sugar cane fibre, macerating and washing the sugar cane fibre to remove left over sugars. The sugar cane fibre may be dried using hot air.

The method may further comprise removing excess moisture from the washed sugar cane fibre before drying the sugar cane fibre.

The sugar cane fibre may be transported on a conveyer during the drying.

The method may further comprise grinding the dried sugar cane fibre into a powder.

The dried sugar cane fibre may be ground to between 1 and 2 microns.

In some embodiments, excess heat energy generated during one or more of the steps of pasteurising and separating of the sugar cane juice may be used to dry the sugar cane fibre.

According to a further aspect, there is provided a system for processing raw sugar cane juice, comprising: an acidification unit for reducing the pH of the sugar cane juice to a pH at which microbiological activity is substantially eliminated; a first separation unit for separating chlorophyll from the sugar cane juice; a second separation unit for separating particles having a diameter greater than 0.5 microns from the sugar cane juice; a pasteurisation unit for denaturing polyphenol oxidase (PPO) in the sugar cane juice by pasteurisation; a third separation unit for separating the denatured polyphenol oxidase from the sugar cane juice.

The system may further comprise a neutralisation unit for increasing the pH of the sugar cane juice after denaturing the PPO and before separating the denatured PPO from the sugar cane juice.

The system may further comprise a heater for heating the reduced pH sugar cane juice to between 50° C. and 70° C. before separating the chlorophyll from the reduced pH sugar cane juice.

One or more of the first separation unit, the second separation unit and the third separation unit may comprise a centrifuge.

The second separation unit may comprise a micro-filtration unit.

The pasteurisation unit may comprise one or more of:
a) a heat pasteuriser;
b) a pulsed electric field (PEF) pasteuriser;
c) a high pressure pasteuriser.

The acidification unit may be configured to reduce the pH of the sugar cane juice to between 3.8 and 4.2.

The acidification unit may be configured to reduce the pH of the sugar cane juice to the isoelectric point of a centerpiece constituent of chlorophyll present in the sugar cane juice.

The neutralisation unit may be configured to increase the pH of the sugar cane juice to between 4.2 and 7.

The acidification unit may be configured to reduce the pH of the sugar cane juice using citric acid.

The neutralisation unit may be configured to reduce the pH of the sugar cane juice using sodium bicarbonate.

The second separation unit may be configured to remove particles having a diameter greater than 0.2 microns.

The pasteurisation unit may be configured to heat the filtered sugar cane juice to between 80° C. and 100° C. for between 10 and 20 seconds.

The pasteurisation unit may be configured to heat the filtered sugar cane juice. The sugar cane juices may be cooled before increasing the pH of the pasteurised sugar cane juice.

The system may further comprise one or more agitators for agitating the sugar cane juice during one or more of the steps of reducing pH, increasing pH, and pasteurisation.

The system may further comprise a brix adjustment unit for concentrating the sugar cane juice by evaporation to form a concentrated sugar cane syrup.

The system may further comprise a cleaning unit for cleaning sugar cane; and an extraction unit for extracting the raw sugar cane juice from the cleaned sugar cane.

The cleaning unit may be configured to pressure wash, tumble and/or scrub the sugar cane.

The cleaning unit may be configured to irrigate the sugar cane with a biocide or a peroxide.

The cleaning unit may be configured to irrigate the sugar cane with water at a predetermined temperature after irrigation with the biocide or peroxide.

The extracting unit may be configured to separate sugar cane fibre from the extracted sugar cane juice.

The system may further comprises a drying unit for drying the sugar cane fibre.

The system may further comprise a preparation unit for macerating and washing the sugar cane fibre to remove left over sugars before drying the sugar cane fibre.

The sugar cane fibre may be dried using hot air.

The preparation unit may be further configured to remove excess moisture from the washed sugar cane fibre before drying of the sugar cane fibre.

The system may further comprise a conveyer for transporting the sugar cane.

The system may further comprise a grinding unit for grinding the dried sugar cane fibre into a powder.

The grinding unit may be configured to grind the dried sugar cane fibre to between 1 and 2 microns.

Excess heat energy generated during one or more of the steps of pasteurising and separating of the sugar cane juice is used to dry the sugar cane fibre.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described, by way of non-limiting example, with reference to the accompanying drawings, in which.

DESCRIPTION OF EMBODIMENTS

Embodiments of the present disclosure encompass a whole-of-process approach to sugar cane juice and fibre production which can achieve highly efficient conversion of freshly cut sugar cane into food-grade stabilised sugar cane juice, syrup, and powder thereby maximising the maintenance of vitamin and mineral levels present in the sugar cane product. Embodiments described herein may aid in increasing the efficiency of processing sugar cane in a microbiologically controlled environment with little or no loss of health-promoting compounds in the final product.

For example, the inventors have developed a two stage process involving separate juice clarification steps. In a first clarification step, cellulose and chlorophyll are aggregated and removed from the juice. In a second clarification step, polyphenol oxidase (PPO) is removed from the juice. By inactivating the chlorophyll and PPO during the removal process, enzymatic browning is substantially eliminated. The resultant sugar cane juice product can maintain all of the flavonoids and mineral components present in the original raw sugar cane, whilst its clarity and stability may be greatly improved compared to juice manufactured from prior art processes.

Figure 1:
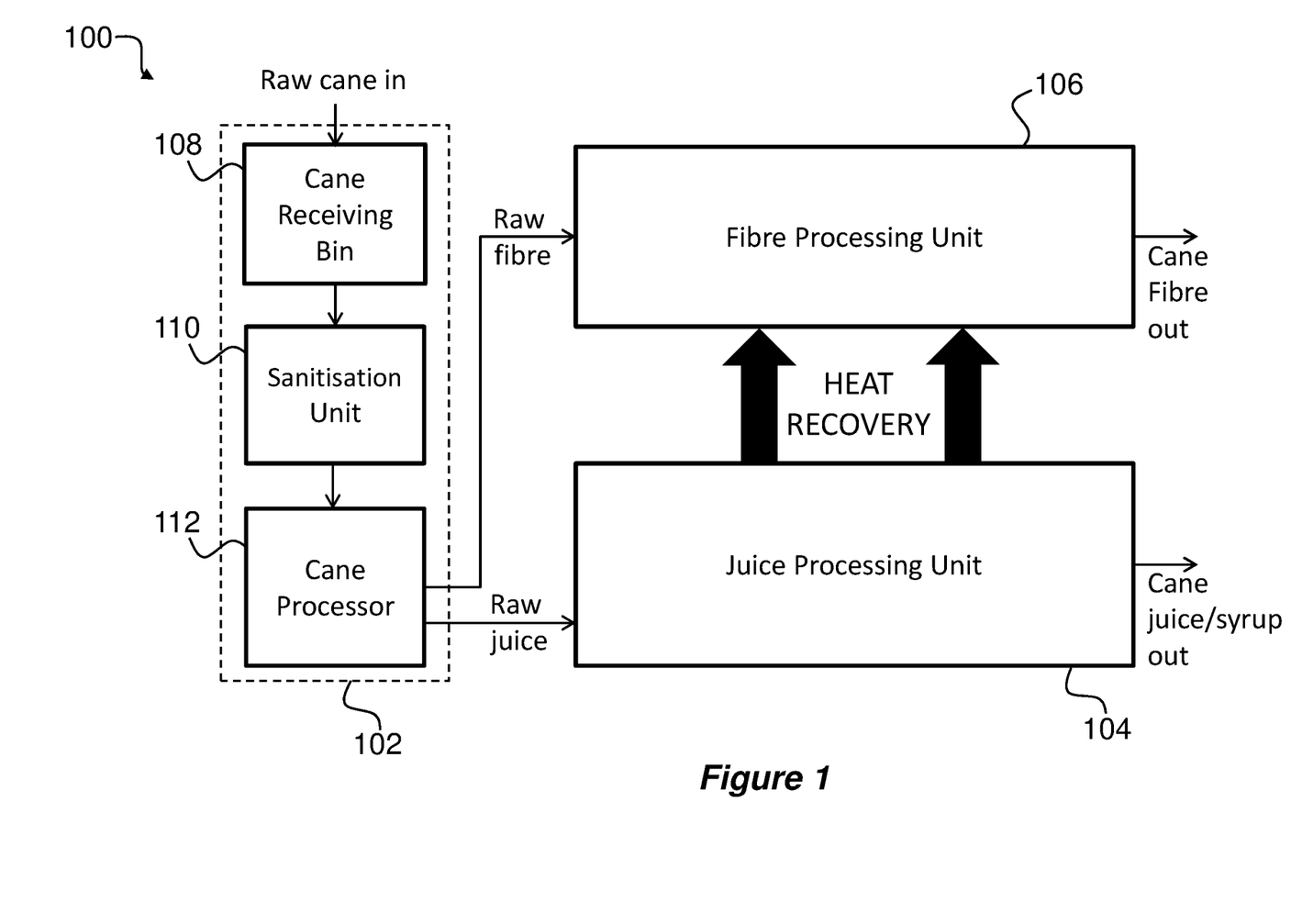
FIG. 1 is a schematic diagram of a sugar cane processing system according to an embodiment of the present disclosure.

FIG. 1 is a schematic diagram of a sugar cane processing system 100 according an embodiment of the present disclosure. The system 100 comprises a raw cane preparation unit 102, a juice processing unit 104 and a fibre processing unit 106. The cane preparation unit 102 comprises a cane receiving bin 108, a sanitisation unit 110 and a cane processor 112. The cane preparation unit 102 is operable to receive harvested cane and turn it into raw cane juice and raw cane fibre which are then passed to the juice processing unit 104 and fibre processing unit 106 respectively.

In order to maximise the preservation of health-promoting compounds in the cane, it is important that there is as little delay as possible between harvesting and processing of the cane. Accordingly, the system 100 is preferably located in close proximity to the grow site of the cane being processed.

Raw cane may be transported through the system 100 in any suitable manner. However, it is preferable that many or all of the units of the system 100 are in close proximity. Suitable apparatus for transporting the cane through each of the units and from one unit to another include conveyors, shoots, hoppers and feeding gear. However, other methods of automated transport of the cane through the system are known in the art and are not outside the scope of embodiments of the present disclosure.

Figure 2:
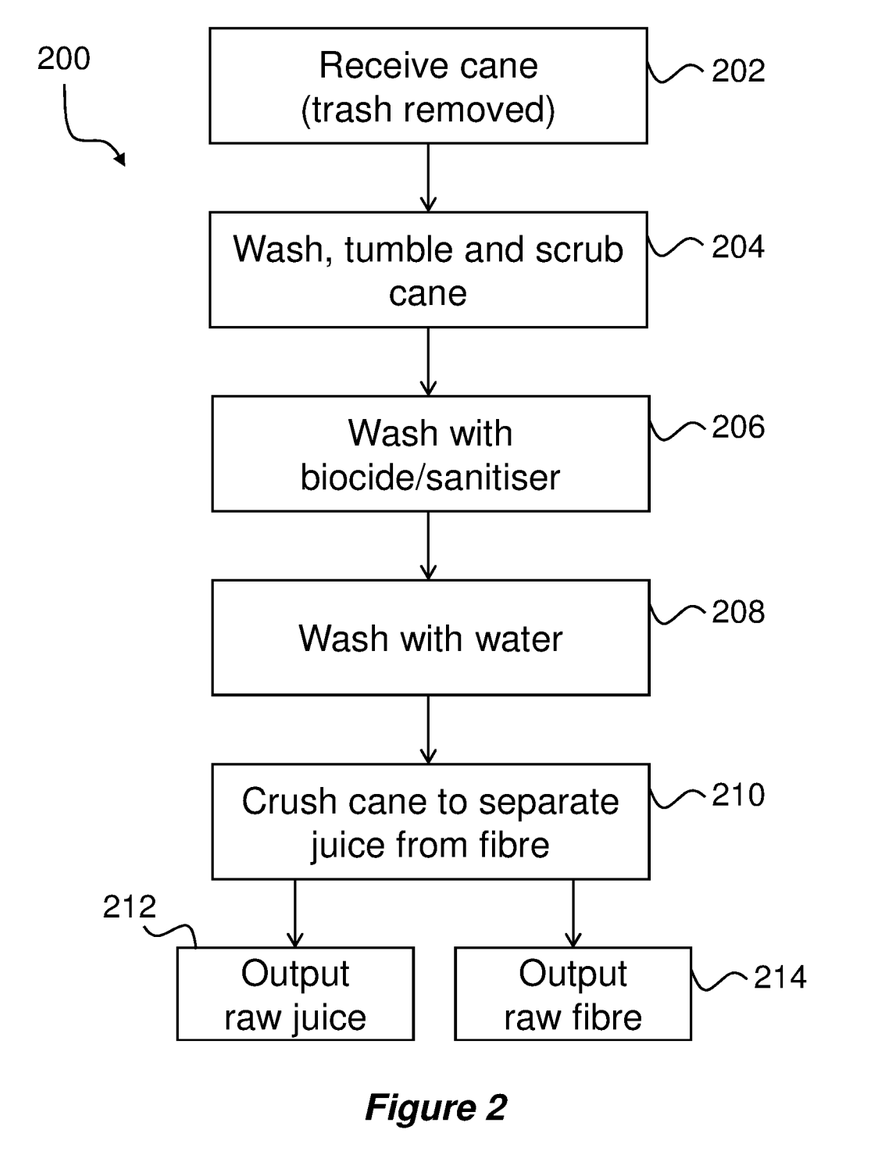
FIG. 2 is a flow diagram of the process performed by a module of the system of FIG. 1.

Referring to FIG. 2, a process 200 performed by the cane preparation unit 102 will now be described. At step 202 raw sugar cane is received at the cane receiving bin 108. The cane may be received at the receiving bin 108 in harvested billets or as whole stick cut cane. During harvesting, billets are produced by removing the top, leafy end of the cane and a portion of the lower part of the cane closest to the ground. The remaining cane is then chopped into short sections (20-30 cm in length) to form the billets. If whole stick cut cane is provided to the receiving bin 108, the cane stalks may be broken down in or near the receiving bin by a shredder or a forage header arrangement before or after proceeding through the subsequent sanitisation unit 110. In either circumstance, the cane is preferably free of any green leaves, known as trash.

It is common for farmers to irrigate sugar cane plots before harvesting. In doing so, bacteria from rotten vegetation on the field floor is absorbed by the sugar cane. It is preferable to remove as much of this bacteria as possible before extraction of juice from the cane. Accordingly, from the receiving bin 108, the cane proceeds to the sanitisation unit 110 in any known manner, for example, via a conveyer. In the sanitisation unit 104, steps 204 and 206 are carried out. At step 204, the raw cane is washed, tumbled and scrubbed to remove any excess debris and impurities picked up from the field or during harvesting and transport. In one embodiment, this sanitisation process is performed using vibrating washing screens. The cane is preferably washed in a two-step process. In the first step 206 of this process, the cane may be irrigated with a biocide, such as an organic biocide, an example of which is Tsunami®, to sterilize and destroy any harmful organisms on the surface of the cane. In other embodiments, a peroxide may be used to wash the sugar cane. In a second step 208, whilst still on the washing screens, the raw cane is sprayed with warm or hot water to remove the biocide or other sanitiser and to maintain biological control in the sanitisation unit 110. The water used to wash the raw cane is preferably at a temperature between 30° C. and 80° C. For example, the water used to wash the cane may be at a temperature less than 50° C., 55° C., 60° C., 65° C., 70° C., 75° C. or 80° C. For any of these upper temperature limits, where applicable, the water used to wash the cane may be at a temperature greater than 30° C., 35° C., 40° C., 45° C., 50° C., 60° C., 65° C.

The washed cane is then transported to the cane processor 112 using, for example, hoppers and feeding gear. The cane processor 112 then separates the cane at step 210 into raw juice and fibre. This process may involve shredding and crushing of the cane in a known manner, for example, using an extraction device such as a belt press, hammer, roller, screw press, centrifugal separator or any other mechanical juice extractor device operable to extract juice from the raw cane juice and separate the fibre.

Once the juice and fibre have been extracted and separated, the raw juice is output at step 212 to the juice processing unit 104 and the raw fibre is output at step 214 to the fibre processing unit 106 to be further processed. In alternative embodiments, the raw fibre is discarded and only the raw juice is further processed.

The raw juice output to the juice processing unit 104 typically has a sugar concentration of 23° Br and a pH of around 5.45.

Figure 3:
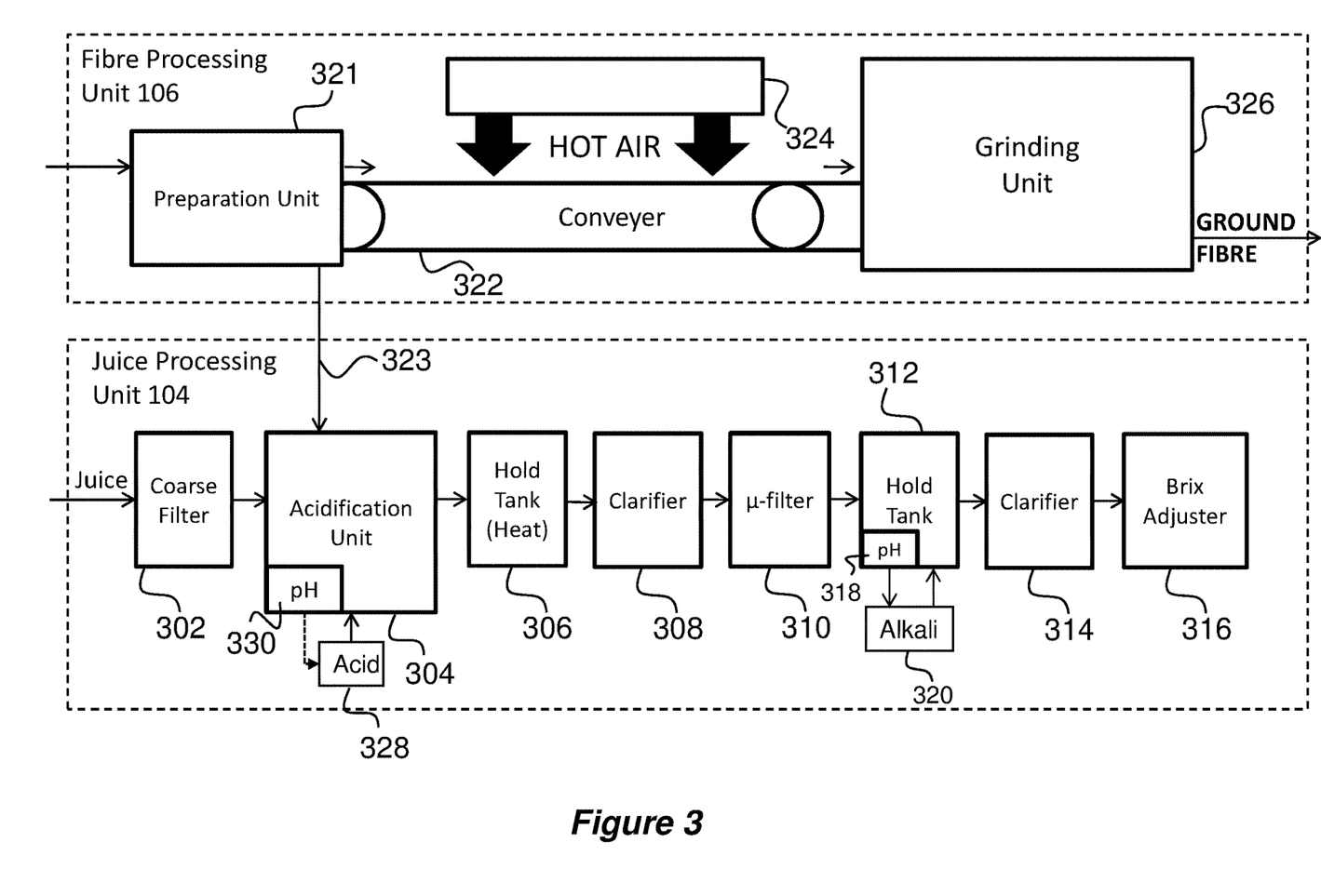
FIG. 3 is a detailed schematic diagram of the fibre processing unit and the juice processing unit shown in FIG. 1.

Referring to FIG. 3, a detailed schematic diagram of the juice processing unit 104 and the fibre processing unit 106 is shown. The juice processing unit 104 comprises a plurality of processing modules connected in line (as denoted in FIG. 3 by arrows shown therebetween). The juice can be pumped through the juice processing unit 104 by one or more pumps (not shown). It will be appreciated that any suitable pump arrangement may be used for this purpose, provided that the juice is not damaged when pumped through the processing unit 104. In some embodiments, one or more lobe pumps may be used.

Components of the juice processing unit 104 may include a coarse filter 302, an acidification unit 304, a first holding tank 306, a first clarifier 308, a microfiltration unit 310, a second holding tank 312, and a second clarifier 314. The juice processing unit 104 may further comprise a brix adjustment unit 316 for increasing the concentration of the sugar cane product, as will be described in more detail below. A pasteuriser (not shown) may also be provided to pasteurise the sugar cane juice. The pasteuriser may be positioned at the output of the second clarifier 314, integrated into the brix adjustment unit 308, or positioned at the output of the brix adjustment unit 308. Equally, one or more additional pasteurisation units may be provided in any of the above described positions in the processing unit 104.

The coarse filter 302 is provided with a juice input for receiving raw sugar cane juice from the cane processor 112. The filter 302 is configured to remove large particulate matter from the raw juice, such as cellulose or fibre left over in the raw sugar can juice from juice extraction. The filter 302 may be in the form of a mesh bag or grating. The coarse filter 302 may be configured to remove particles greater than 10 microns in diameter and preferably 5 microns in diameter.

It is advantageous to acidify the raw juice as early as possible to prevent the juice from undergoing enzymatic browning. Accordingly, the acidification unit 304 is provided to receive juice output from the cane processor 112 via the coarse filter 302. The acidification unit 304 is provided with one or more agitators configured to stir the juice together with an acid injection unit 328 configured to inject acid, such as food acid, into the acidification unit 304 for acidification of the raw sugar cane in the acidification unit 304. The acid injection unit 328 may comprise one or more inline injectors and a controller (not shown) for controlling the rate of injection of acid into the acidification unit 304. The acidification unit 304 may also comprise a pH meter 330 configured to measure the pH of the juice/acid mixture in the acidification unit 304 and feed this information back to the to the acid injection unit 328. Based on this received pH information, the acid injection unit 312 is configured to control the amount of acid injected into the acidification unit so as to maintain the pH of the contents of the acidification unit 304 at a predetermined pH level.

The first holding tank 306 comprises a heater and one or more agitators for heating juice output from the acidification unit 304. In other embodiments, in place of the first holding tank 306, the acidification unit 304 itself may be used to heat the juice after acidification.

The first and second clarifiers 308, 314 are provided to remove aggregated solids from the juice at various stages of the process, as will be described in more detail below. Preferably, the first and second clarifiers 308, 314 each comprise a centrifuge as is known in the art. Alternatively, the first and second clarifiers 308, 314 may comprise a separator or decanter.

The microfiltration unit 310 is configured to remove fine particulate matter from the juice. Preferably, the microfiltration unit is operable to filter out particles having a diameter larger than 0.5 microns. By doing so, bacteria and larger proteins (which cause the juice to discolour) can be filtered out of the juice whilst allowing flavonoids and mineral components to pass.

The second holding tank 312 receives juice from the microfiltration unit 310 and comprises a pH meter 318 configured to measure the pH of the juice and feed this information back to an alkali injection unit 320. Based on this received pH information, the alkali injection unit 312 is configured to control the amount of alkali injected into the acidification unit so as to maintain the pH of the contents of the holding tank 312 at a predetermined pH level.

Figure 4:
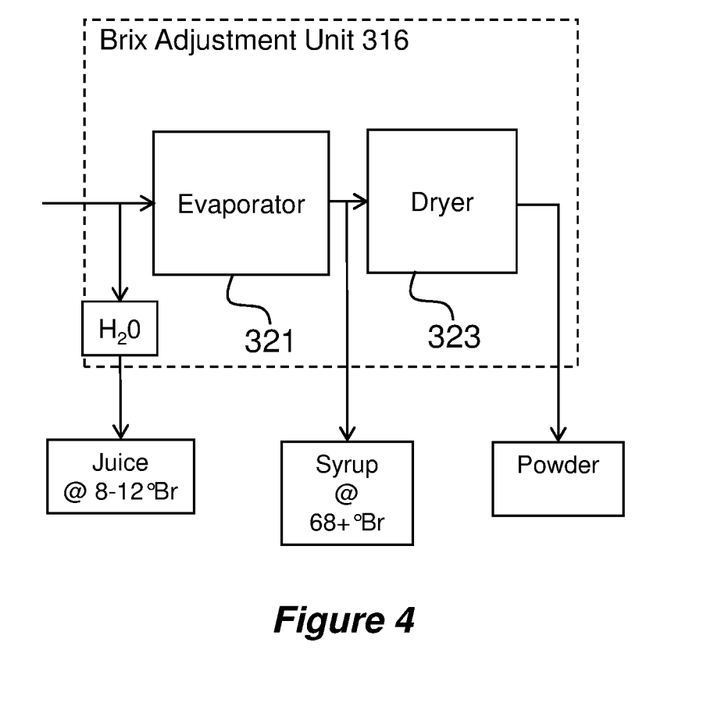
FIG. 4 is a detailed schematic diagram of the brix adjustment module shown in FIG. 3.

The brix adjustment unit 316 is shown in more detail in FIG. 4 and comprises an evaporator 321 for increasing the sugar concentration of the raw cane juice to produce syrup, together with a dryer 323 configured to substantially remove all water from the juice, thus producing a dry powder.

The evaporator 321 may be a falling film type and may have multiple effects. In other words, the evaporator 321 may comprise multiple falling film evaporators, the condensate of a first falling film evaporator (known as the first effect) providing the input to a second falling film evaporator (known as the second effect) and so on. Preferably, the evaporator 321 comprises a multi-effect falling film evaporator comprising three or more effects.

The dryer 323 is operable to produce a dry powder from the sugar cane syrup output from the evaporator 321. In some embodiments, the dryer 323 is a spray dryer.

Figure 5:
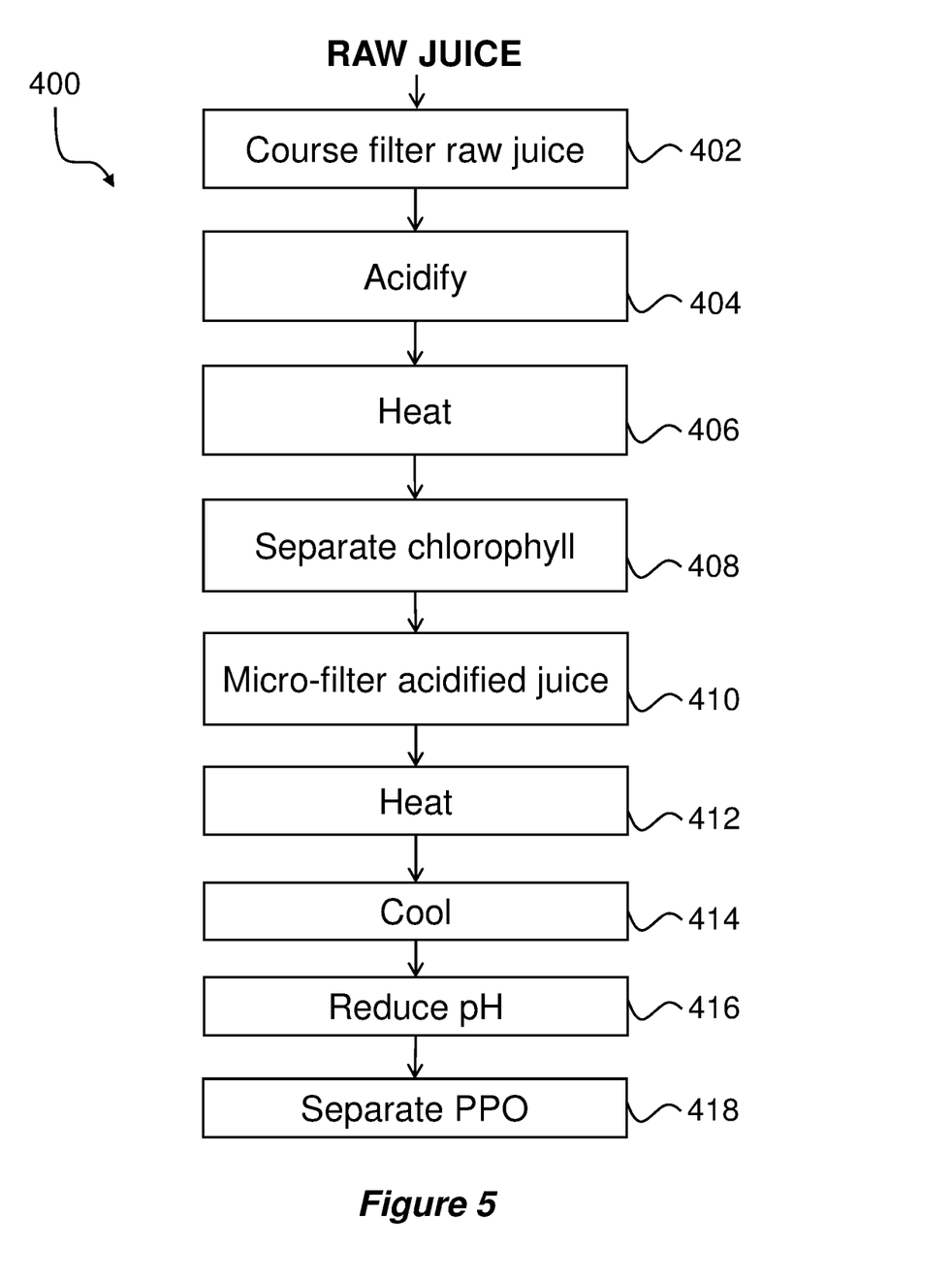
FIG. 5 is a flow diagram illustrating a method of processing raw sugar cane juice.

Operation of the juice processing unit 104 shown in FIGS. 3 and 4 in accordance with an embodiment will now be described with reference to the flow diagram shown in FIG. 5.

At step 402, the raw sugar cane juice received from the cane processor 112 is filtered using the coarse filter 302 to remove cellulose or fibre left over in the raw sugar cane juice from juice extraction.

The coarse filtered sugar cane juice is then acidified at step 404 by addition of acid by the acid injection unit 312. The pH of the juice is lowered at least to a point at which microbiological activity is substantially ceased, i.e. to below pH 4.2.

Preferably, the pH of the juice is reduced to substantially at the isoelectric point of chlorophyll. By doing so, the net electrical charge of the chlorophyll can be reduced to substantially zero, enabling the chlorophyll to be more easily removed during clarification. The isoelectric point of chlorophyll is around 3.86, but can vary depending on the amount of sugar present in the sugar cane being processed which, in turn, may depend on the maturity of the sugar cane (where it was in its development cycle when harvested) and the amount of nitrates present in the soil. Accordingly, the target pH may be adjusted to account for seasonal and compositional variations in the sugar cane being provided to the cane preparation unit 102. Accordingly, in some embodiments, the pH of the juice can be reduced and maintained at between 3.7 and 4.

In addition to the above, reducing the pH of the juice to below 4.0 inactivates any polyphenol oxidase (PPO) present in the juice, thereby substantially reducing PPO-related enzymatic browning of the juice during subsequent processing steps; a further benefit of acidifying the juice at the start of the process.

The inventors have found that the addition of a relatively weak acid at high concentrations allows for better control of pH. An example of a suitable weak acid is ascorbic acid which may be injected by the acid injection unit 312 into the acidification unit 302. In some embodiments, a solution of approximately 20% concentration ascorbic acid is used. In one embodiment, this solution is made at 50° C. by combining 600 grams of ascorbic acid with 2400 grams of water. In other embodiments, citric acid may be used. Alternatively, relatively acidic fruit juices such as lemon juice or lime juice may be used to reduce the pH of the sugar cane juice.

With the pH of the sugar cane juice product reduced to a point at which a) microbiological activity is substantially ceased, b) PPO is inactive and c) chlorophyll in the juice is at substantially zero net electrical charge, at step 406 the juice may be heated to a temperature of between 50° C. and 70° C., preferably 60° C. to 70° C. and more preferably 65° C. By increasing the temperature of the juice the density differential between the chlorophyll and any remaining cellulose on the one hand and the aqueous juice solution on the other hand is increased. This causes the chlorophyll to aggregate and flocculate in preparation for the next step of the process 400 in which the chlorophyll is removed from the juice.

At step 408 the chlorophyll and remaining cellulose present in the acidified juice is separated from the juice product in the first clarifier 308. This step is preferably by centrifuge, but may alternatively be performed using a filter.

From the first clarifier 308, at step 410, the juice passes into the microfiltration unit 306 where fine particulate matter, such as proteins, are separated from the juice. Preferably, particulate matter greater than 0.5 microns in diameter is separated from the juice at this stage. This may include bacteria and particulate matter which has a diameter greater than 0.5 microns but which does not have a large enough density differential relative to the bulk aqueous juice to be separated in the first clarifier 308 at step 408. Instead of using a microfiltration device to separate this matter from the juice, a centrifuge, such as a bactofuge, may be used.

It is noted that the steps 408, 410 of separating, on the one hand chlorophyll from the juice, and on the other hand other fine particular matter from the juice, are performed in two separate steps. In other embodiments, however, these two steps may be combined into a single step in which both chlorophyll and other fine particulate matter having a diameter greater than, e.g. 0.5 microns, is separated from the juice at the same time. In such embodiments, a bactofuge may be used to perform this process.

The result of microfiltration at step 410 is an acidified juice product containing sugars, flavonoids, minerals and inactivated PPO. At this point, the juice typically has a pH of below 4.0 so as to inactivate PPO present in the juice. However, without removing the PPOs, raising the pH of the juice to a neutral state would cause the PPO and other enzymes to activate and begin the process of browning the juice to its detriment.

Accordingly, at step 412, the juice is heated to a temperature which denatures any PPO enzymes and other enzymes present in the juice. In some embodiments, the juice is heated to a temperature of 95° C. for 10 minutes. However, any heat treatment process may be used, so long as it leads to the denaturing of the PPO and other enzymes contained in the juice whilst not affecting the juice's flavonoids and mineral components. Accordingly, in some embodiments, the juice may be heated to 80° C., 85° C., 90° C., 95° C., 100° C., 105° C., 110° C., 115° C., or 120° C. The time at which the juice is maintained at any one of those temperatures may be 5 seconds, 10 seconds, 15 seconds, 20 seconds, 25 seconds, 30 seconds, 35 seconds, 40 seconds, 45 seconds or 50 seconds, for example.

This heat treatment step 412 may be performed in the second holding tank 312 or, alternatively, in a separate holding tank positioned between the microfiltration unit 310 and the second holding tank 312. In either case, the temperature differential ΔT across the walls of the tank in which the juice is heated is preferably maintained to as low as possible to prevent caramelisation of sugars from the juice at the walls of the tank. Accordingly, in some embodiments, the tank is agitated and/or is provided with a water jacket. Alternatively, the juice may be passed through a heat exchanger to raise its temperature.

Whilst embodiments described herein use high temperature, short time (HTST) heat treatment, in alternative embodiments, other methods of heat treatment may be implemented instead of or in addition to heat pasteurisation, including but not limited to pulsed electric field pasteurisation and high pressure processing. The pasteurisation step may comprise one or more of these pasteurisation techniques. For example, pasteurisation may employ heat pasteurisation in combination with pulsed electric field pasteurisation.

Subsequent to the heat treatment step 414 described above, the juice may be cooled (passively or actively) at step 414 to the temperature it was before heat treatment. For example, the juice may be cooled to between 50° C. and 70° C., preferably 60° C. to 70° C. and more preferably 65° C. This cooling may be performed in the holding tank 312 or in a separate tank (not shown) or may be performed using a heat exchanger such as a tubular heat exchanger.

Now that the PPO enzymes (and other enzymes present in the juice) are no longer live, the pH of the juice can be raised at step 416 without risk of spoiling the clarity of the juice due to enzymatic browning. Depending on the brix concentration of the desired final product, the pH of the juice can be raised to between 4 and 7. Raising the pH of the juice to 6.5 enables the juice to be mixed with products having key ingredients with an isoelectric point of around 6.5.

Preferably, the pH of the juice is raised using a weak alkali so as to prevent sugars in the juice from burning when coming into contact with the alkali. In some embodiments, an 8% saturated solution of sodium bicarbonate (having a pH of 7.7) is used. Even using a weak alkali such as bicarbonate soda, it is advantageous to agitate the juice alkali mixture to prevent molecular sugar in the juice from burning and to ensure even distribution of the alkali in the solution. In other embodiments, a stronger alkali can be used to neutralise the acidified juice. In such instances, the alkali may be added to the juice using a turbo mixer or the like, again so as to prevent burning of sugars in the juice.

It will be appreciated that in some embodiments a final product having a pH of around 4 may be desirable. The step 416 of increasing the pH of the juice is optional, therefore, and may be left out of the process 400.

As well as preparing the juice for brix adjustment, raising of the pH of the juice also causes denatured PPO enzymes contained therein to aggregate which in turn increases the efficiency of removal of such PPO enzymes in subsequent process steps. To further improve the efficiency of separation of the PPO from the juice, the neutralised juice may be left to stand (without agitation) to allow the flocculated PPO enzymes to settle at the bottom of the tank. The juice can then be separated from the majority of the PPO before being clarified at step 418, for example in the second clarifier 314.

During clarification at step 418, the juice is separated from the remaining PPO, other enzymes, and the vast majority of microbiological organisms still remaining in the juice. Clarification at step 418 may be performed by centrifuging, filtering and/or by decanting the supernatant juice after flocculation of the enzymes during settling.

The resultant juice product after clarification at step 418 is a substantially transparent aqueous sugar cane product absent of cellulose, chlorophyll and PPO enzymes and rich in flavonoids and minerals which were originally present in the raw sugar cane juice.

After the juice has been clarified at step 418, it may then pass into the brix adjustment unit 316 to be processed into a final product, be it juice, syrup or powder. The brix adjustment unit 316 may be configured to process the raw juice into all three final products or one or two of juice, syrup and powder.

Figure 6:
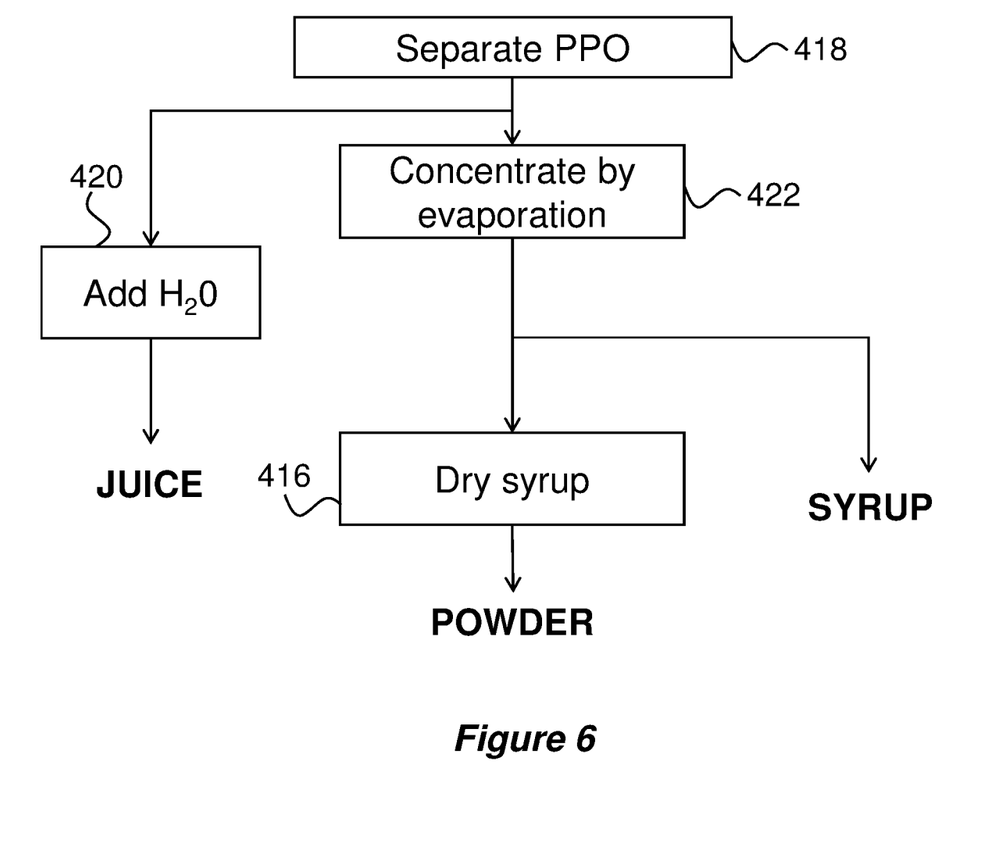
FIG. 6 is a flow diagram illustrating a method of adjusting brix concentration of juice processed using the method shown in FIG. 5.

Referring now to FIG. 6, if the desired end product is sugar cane juice, the brix concentration of the juice may be adjusted to between 8° Br and 12° Br by addition of water at step 420. The final product is a food grade, sterile sugar cane juice having a high mineral and vitamin content. The juice may be discharged via an industry standard aseptic filler into bulk containers or chilled tankers, depending on distribution requirements. The final juice product may be packaged using any suitable process known in the art.

If the desired end product is sugar cane syrup, at step 422, the juice is pumped into the evaporation unit 321 to increase the sugar concentration (brix) in the juice by evaporation of water out of the juice. The temperature for evaporation is chosen so as limit damage to the juice whilst still achieving the required evaporation. In examples, the evaporator may operates at between 40 and 45° C., between 45 and 50° C., between 55 and 60° C., between 60 and 65° C., or between 65 and 70° C. To reduce the temperature of evaporation of water in the evaporation unit 321, the pressure in the evaporation unit 321 may be increased. Where a falling film evaporator is used, the vapour from each effect may be used in the production of sugar cane essence.

It will be appreciated that the concentrated sugar cane syrup produced in the evaporation unit 321 will have a reduced pH relative to the sugar cane juice provided to the evaporation unit 321 due to its increased concentration. Accordingly and as mentioned above, at step 416, the pH of the juice is adjusted to take into account for evaporation during step 422.

The concentrated syrup may optionally be pasteurised by heating to between 60° C. and 120° C. for between 10 and 50 seconds. In various embodiments, the syrup may be heated to 60° C., 65° C., 70° C., 75° C., 80° C., 85° C., 90° C., 95° C., 100° C., 105° C., 110° C., 115° C., or 120° C. The time at which the syrup is maintained at any one of those temperatures may be 10 seconds, 15 seconds, 20 seconds, 25 seconds, 30 seconds, 35 seconds, 40 seconds, 45 seconds, or 50 seconds.

Whether or not the above pasteurisation step takes place, the syrup may then be discharged to an aseptic filler to be distributed as required (bottled, placed in bulk containers, chilled tankers etc.).

If the desired end product is sugar cane powder in dry form, then at step 416, the syrup produced in the evaporation unit 321 is input into the dryer 323 and atomized using an atomiser, such as a rotating disc or a high pressure single or two-fluid nozzle, which atomises the syrup as it is fed into a hot vapour stream and vaporised. Due to the high surface tension of water, solids form as the moisture quickly leaves the atomised droplets thereby forming dry solids which fall to the bottom of the dryer 323.

In some embodiments, the atomiser is a two-fluid nozzle atomizer. In such cases, a pressurized gas, such as carbon dioxide, is provided as the second fluid in combination with the sugar syrup (the first fluid).

It will be appreciated that the juice processing unit 104 may produce final juice and syrup/powder products in parallel.

Figure 7:
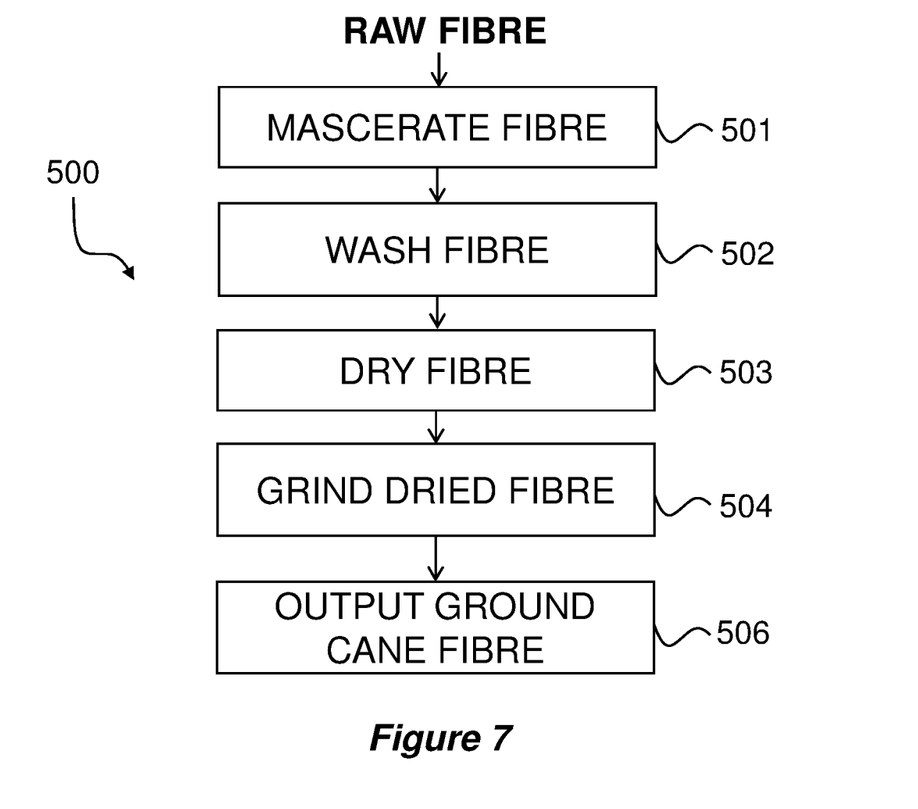
FIG. 7 is a flow diagram of a process performed by the fibre processing unit shown in FIGS. 1 and 3.

In addition to the production of refined sugar cane juice and/or syrup, the fibre separated at the cane processor 112 may be processed by the fibre processing unit 106. The fibre processing unit 106 comprises a preparation unit 321, a conveyer 322, one or more cane dryers 324 and a grinding unit 326. FIG. 5 shows a flow diagram of the process 500 performed by the fibre processing unit 106. At step 501 raw cane fibre is received by the fibre processing unit 106 from the cane processor 112 and enters the preparation unit 321 configured to remove any excess sugars from the fibre which would otherwise cause browning of the fibre. The processing unit 321 comprises a macerator which macerates the fibre to reduce the particle size of the fibre. This improves water transfer through the fibre which in turn increases the efficiency and removal of sugars from the fibre. The processing unit 321 further comprises a washer, such as a counter-flow washer. At step 502, the fibre is washed by the washer to remove excess sugars. In addition, the preparation unit 321 may further comprise a decanter or other means for removing excess moisture from the fibre before drying. Juice extracted from the sugar fibre may optionally be added to the sugar cane juice during processing in the juice processing unit 104. For example, the extracted juice from the preparation unit 321 may be fed into the acidification unit 304 as denoted by arrow 323, or via the coarse filter 302 to the acidification unit 304. A decision as to whether to add the juice extracted in the preparation unit to the juice being processed in the juice processing unit 104 may be based on the quality of the sugars removed and the use of the juice being processed.

From the preparation unit 321, the raw cane may be transported through the fibre processing unit 106 on the conveyer 322. At step 503, the raw macerated and washed cane is dried by hot air output from the one or more cane dryers 324 as the cane moves along the conveyer 322. The conveyer 322 then transports the dried cane to the grinding unit 326 where, at step 504, it is ground in any known manner. Preferably, the fibre is ground to between 1 and 2 microns, 2 and 3 microns, 3 and 4 microns or 4 and 5 microns. The dry ground cane fibre is then output at step 506 and packaged in any known manner.

It will be appreciated that the holding tanks 306, 312, evaporation unit 321 and dryer 323 are not 100% efficient and so each produce at least some excess heat when in use. The inventors have determined that this lost heat energy can be harnessed to provide heat to the fibre processing unit 106, thus reducing overall power consumption. In some embodiments, heat radiating from apparatus in the juice processing unit may be ducted into the fibre processing unit and used to heat or preheat air entering the cane dryers 324 so as to reduce the load on the heaters disposed therein. Additionally or alternatively, this warm air may be fed through heat exchangers located in the fibre processing unit 106 to increase the ambient temperature therein, again thereby reducing the load (and therefore energy consumption) on the cane dryers 324.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method of processing raw sugar cane juice, comprising:
   performing a first clarification comprising:
      reducing the pH of the sugar cane juice to a pH of 4 or less;
      separating chlorophyll from the sugar cane juice; and
      separating particles having a diameter greater than 0.5 microns from the sugar cane juice; and
   performing a second clarification comprising:
      denaturing polyphenol oxidase (PPO) in the sugar cane juice by pasteurisation; and
      separating the denatured polyphenol oxidase from the sugar cane juice.

2. The method of claim 1, further comprising:
   increasing the pH of the sugar cane juice after denaturing the PPO and before separating the denatured PPO from the sugar cane juice.

3. The method of claim 1, comprising heating the reduced pH sugar cane juice to between 50° C. and 70° C. before separating the chlorophyll from the reduced pH sugar cane juice.

4. The method of claim 2, wherein increasing the pH comprises increasing the pH to between 4.2 and 7.

5. The method of claim 2, further comprising:
   concentrating the sugar cane juice by evaporation to form a concentrated sugar cane syrup.

6. The method of claim 1, wherein one or more of the separating of the chlorophyll, the separating of the particles having a diameter greater than 0.5 microns, and the separating of the denatured polyphenol oxidase from the sugar cane juice comprises centrifuging the sugar cane juice.

7. The method of claim 1, wherein separating the particles having a diameter greater than 0.5 microns from the sugar cane juice comprises micro-filtering the sugar cane juice or bactofuging the sugar cane juice.

8. The method of claim 1, wherein reducing the pH comprises reducing the pH to between 3.7 and 4.0.

* * * * *